July 8, 1941.  A. W. REDIN  2,248,384
SPEED-CHANGE MECHANISM
Filed Jan. 30, 1939
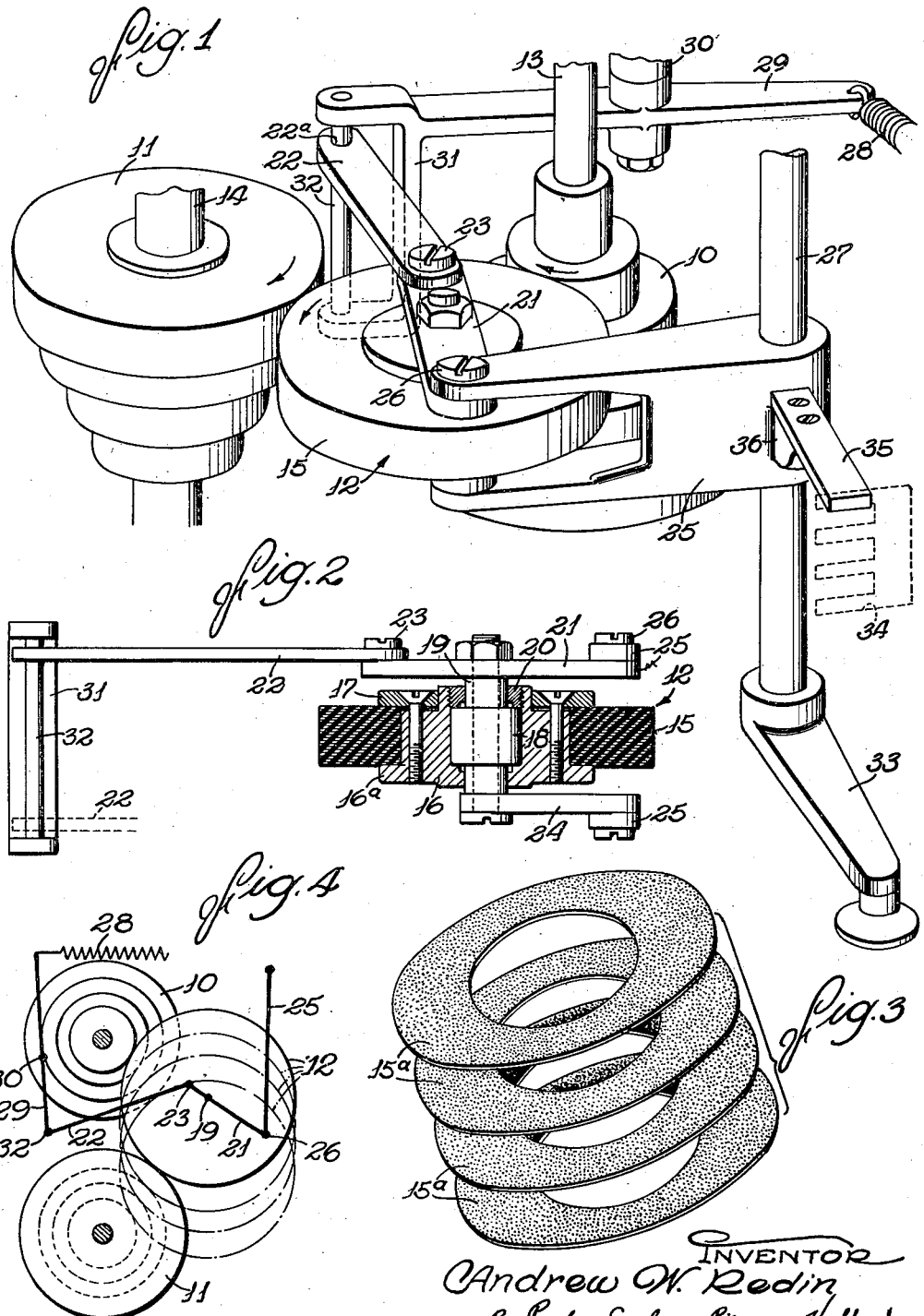
INVENTOR
Andrew W. Redin
By Parker, Carlson, Pitzner Hubbard
ATTORNEYS Patented July 8, 1941

2,248,384

UNITED STATES PATENT OFFICE 2,248,384

SPEED-CHANGE MECHANISM

Andrew W. Redin, Rockford, Ill.

Application January 30, 1939, Serial No. 253,496

4 Claims. (Cl. 74—193)

The invention relates to improvements in speed-change mechanisms and more particularly to such devices which are suitable for use in various machine tools such, for example, as drill presses, lathes, milling machines, and the like.

One object of the invention is to provide a speed-change mechanism of the type embodying a pair of stepped-cone pulleys connected by an axially shiftable idler roller, in which an improved arrangement is provided for yieldably urging the idler into contact with the stepped-cone pulleys in such manner that the biasing force is always applied to the idler in a direction substantially radially of the same so that there is no tendency on the part of this force to cant or skew the idler. By virtue of this arrangement, the contact pressure on the face of the idler is distributed evenly across the width of such face so that the idler face wears evenly as distinguished from being worn away at one edge when the biasing force applied to the idler acts in a direction partially axially of the latter as well as radially.

Another object of the invention is to provide a mechanism of the type described embodying a novel form of linkage mechanism for shiftably supporting the idler, such linkage being of a character to minimize the over-all dimensions of the mechanism as well as the number of parts required.

Still another object of the invention is to provide a mechanism of the type described which is effective and efficient in operation, rugged in construction and economical to manufacture.

The invention also resides in the improved form of idler roller herein disclosed.

Further objects and advantages of the invention will become apparent as the following description proceeds, taken in connection with the accompanying drawing, in which:

Figure 1 is a general perspective view of a speed-change mechanism embodying the invention.

Fig. 2 is a side elevation of the idler roller, and a portion of the attached linkage, illustrated in Fig. 1, the roller being shown in vertical section.

Fig. 3 is an exploded perspective view of a portion of the laminations included in the idler roller.

Fig. 4 is a diagrammatic plan view of the mechanism of Fig. 1, indicating the positions of the idler roller and its attached linkage in the various positions of adjustment.

For purposes of exemplification, the invention has been illustrated and described herein as embodied in a speed-change mechanism that has been found to be well adapted for use in a drill press. It will be appreciated by those skilled in the art, however, that speed-change mechanisms embodying various aspects of the invention are also applicable to many other types of installations. Accordingly, there is no intention to limit the invention to the particular embodiment disclosed but, on the other hand, the appended claims are intended to cover all modifications and alternative constructions falling within the spirit and scope of the invention.

In brief, the particular mechanism shown (Fig. 1) embodies driving and driven members 10 and 11 respectively, illustrated as stepped-cone pulleys and connected by a shiftable idler or intermediate roller 12. These pulleys may be made of steel or the like and present smooth metallic surfaces. Driving and driven shafts 13 and 14 support the respective pulleys 10 and 11 in spaced relation for rotation about parallel axes. The idler roller 12 is arranged to be shifted axially for peripheral, driving engagement with selected steps on the pulleys 10 and 11. The latter are set back or stepped in opposite directions, axially thereof and the angular velocity of the driven shaft 14 with respect to the drive shaft 13 is determined by the relative circumferences of the pulley portions which the roller 12 engages. For example, when the roller 12 is in engagement with the small end of the driving pulley 10 and, consequently, with the large end of the driven pulley 11, the latter will be rotated at a slower speed than the driving pulley. Conversely, when the roller 12 is in engagement with the larger end of the driving pulley 10 and, consequently, in engagement with the smaller end of the driven pulley 11, the speed of rotation of the latter will be greater than that of the driving pulley.

In accordance with one aspect of the present invention, an improved form of idler roller has been provided. This roller has a tire portion 15 (Fig. 2) which is resilient and yieldable in character, being of the hardness of semi-soft rubber. The roller tire 15 is made up of a series of laminations 15ª (Fig. 3) of cloth or similar textile material impregnated with raw rubber. The laminations are coated with a suitable vulcanizing agent such as sulphur and with a friction material which is preferably fine and substantially non-abrasive, such as powdered rosin. It has been found that a mixture made up of equal portions of powdered sulphur and powdered rosin is suitable for the purpose, although the proportions may be varied as the requirements of particular installations dictate and various other vulcanizing agents or accelerators may be utilized.

In forming the roller tire 15, the laminations 15ª may, for example, be dusted with or dipped in a bed of dry powdered sulphur and rosin mixed in equal proportions. The laminations are then stacked in superimposed relation and a heavy endwise pressure applied to the stack so as to compress it to say two-thirds of its original height. This compressed stack of laminations may then be placed in a suitable vulcanizing flask and the whole mass vulcanized while retained under pressure. This vulcanization serves to join the laminations together into a single unitary structure with the rosin distributed substantially throughout the mass. After vulcanization, the periphery of the tire 15 may be smoothed by turning it on a lathe. The tire is finally mounted on a suitable structure, shown herein (Fig. 2) as including an annular hub 16 with the flange 16ª thereon which presses against one side of the tire 15. On the opposite side of the hub 15 is screwed a face plate 17 which bears against the opposite side of the tire 15. A ball bearing 18 journals the hub 16 on a non-rotating stub shaft 19. The ball bearing has been shown as including an outer race which is force-fitted within a central axial bore in the hub 16 and is held in position therein by a threaded locking bushing 20.

Several important results are achieved by the use of rosin incorporated into the idler roller structure as an incident to its formation. First of all, the traction of the roller tire 15 on a smooth metal surface, such as that of the pulleys 10 and 11, is increased. Furthermore, this high traction is achieved throughout the life of the roller tire since fresh rosin is presented on the tire surface as the latter is worn away due to the fact that the rosin is incorporated throughout substantially the entire body of the tire. Second, a tougher and longer-wearing structure is produced. Third, none of the rubber adheres in lumps to the contacting pulley surface. This latter is true even when the driven shaft is stalled under load. Such action is to be contrasted with the operation of plain rubber rollers on metal pulleys. In the latter case, the rubber from the rollers adheres to the metal pulley surfaces in lumps especially when the pulley is stalled under load with consequently maximum slippage between the roller and pulley. Such adhesion of the rubber to the contacting metal surface appears to be entirely eliminated by the use of rosin distributed throughout the roller structure as described above.

When using such a roller having a yieldable peripheral surface like that described above, it is particularly important that the force utilized to urge the roller into contact with an associated pulley or pulleys should be applied radially of the roller. Otherwise, if there is an axial component of force on the roller there will be a tendency for the roller to be skewed or canted about its axis of rotation so that its periphery is worn unevenly. In the mechanism herein disclosed, an improved arrangement has been provided, as will hereinafter appear in greater detail, by means of which the roller 12 is urged into engagement with the pulleys 10 and 11 by force applied substantially radially of the roller irrespective of the axial displacement of the roller for various speed adjustments. In this way, any wear on the roller periphery occurs smoothly and evenly about the entire roller surface so that it retains exactly its original contour.

In order to support the roller 12 for bodily shifting movement toward and away from the pulleys 10 and 11, an improved form of support has been provided. This support has been shown herein as being in the form of a toggle linkage including links 21 and 22 pivotally connected at the knee of the toggle by a pin 23 (Fig. 1). The roller supporting stub shaft 19 is bolted to the link 21 at a point adjacent the knee of the toggle. On the other side of the roller 12 (Fig. 2) a link 24 is fixed to the lower end of the stub shaft 19. This link 24 corresponds to the link 21 in the toggle and is alined therewith although it is somewhat shorter in length since it is not continued beyond the center of the roller. The two links 21 and 24 are pivoted in the end of a yoke 25 (Fig. 1) by pin 26, this yoke being in turn secured to a rock shaft 27 which is journaled in suitable bearings (not shown) for rotation and for endwise displacement. By oscillating the shaft 27, the roller 12 can be shifted radially toward and away from the pulleys 10 and 11 and, similarly, by shifting the shaft 27 axially the roller 12 can be displaced correspondingly into engagement with selected stepped portions of the driving and driven pulleys.

Yieldable biasing of the intermediate roller 12 into engagement with the pulleys 10 and 11 is achieved by means of a contractile spring 28 (Fig. 1). This single spring 28 is effective to bias the roller into engagement with the pulleys no matter what position of axial adjustment the roller may occupy. In the particular construction shown, the spring 28 is connected to one end of a third class lever 29 carried by fixed pivot 30. Integral with the opposite end of the lever 29 is a fixed jaw or yoke 31 between the arms of which is fixed a pin 32. This pin extends through a hole 22ª in the link 22 so as to form an oscillatable pivot connection therewith. Preferably the link 22 is made of a molded synthetic resin compound such as reenforced Bakelite so that no lubrication of the pin 32 will be required in order to obviate stickiness in the joint between the pin and link. The vertically adjustable connection between the roller 12 and spring biased lever 29, formed by the link 22 and pin 32, causes the biasing force exerted on the roller, by the spring 28, to be always applied in a direction substantially radial of the roller, irrespective of the latter's axial displacement (Fig. 2). In this way the pressure on the periphery of the roller tire 15 is caused to be distributed evenly over the latter's width, and after even extended use the roller tire wears evenly and retains its original contour.

Manual adjustment of the intermediate roller 12 for various speed-change settings may be conveniently accomplished by manipulation of a crank handle 33 (Fig. 1) on the rock shaft 27. To locate the rock shaft and connected roller 12 in various positions of adjustment, a fixed comb 34 is arranged to be engaged by an arm 35 bolted to an integral bracket 36 on the arm 25. Each slot in the comb 34 corresponds to a different axially displaced speed setting adjustment for the roller 12. The handle 33 projects from the mechanism in a convenient position for manipulation, and the remainder of the apparatus may, if desired, be enclosed in a suitable casing or housing (not shown).

In the operation of the speed-change mechanism described above, the operator shifts the roller 12 to various speed-change settings by means of the handle 33. Various speeds of the driven shaft 14, corresponding to the settings of the roller 12, may be marked on the comb 34. To change the mechanism from the low speed setting shown in Fig. 1 to a higher speed setting, the operator grasps the handle 33 and swings it to the right (as viewed in Fig. 1) until the arm 35 clears the teeth of the comb 34. The resulting oscillation of the rock shaft 27 retracts the roller 12 to clear it from the pulleys 10 and 11. Then the operator pulls down on the handle 33 to shift the shaft 27 and roller 12 down until the latter registers with selected steps on the pulleys 10—11. This selected point is indicated by registration of the arm 35 with a corresponding slot in the comb 34. Upon such registration, the operator swings the rock shaft back to its initial position so that the arm 35 enters the selected comb slot. This latter movement is aided by the contractile spring 28, which pulls the roller 12 snugly against the pulleys 10—11.

Aid is given the spring 28 in seating the idler roller 12 against the pulleys 10—11 by utilizing the reaction torque of the system for this purpose. The pulleys 10—11 and roller 12 are so dimensioned that the pressure applied by the pulleys on the roller 12 tends to force or wedge the roller between the pulleys automatically. In this way sufficient pressure to prevent slippage is always assured.

The maximum compactness of the linkage for supporting the roller 12 will be apparent from an examination of Fig. 4. The toggle linkage 21—22 is so arranged that it falls on opposite sides of a straight-line or dead-center position for approximately equal numbers of adjustment positions. In that way maximum variations in roller positions are accomplished while swinging the linkage over a minimum area. Furthermore the successive positions occupied by the center or knee of the toggle linkage lie in substantially a straight line with the result that the slots in the comb 34 can all be of approximately the same depth.

I claim as my invention:

1. A speed-change mechanism comprising, in combination, a pair of stepped-cone driving and driven pulleys disposed side by side in spaced relation, an idler roller intermediate said pulleys and shiftable generally axially of the pulleys into peripheral engagement with selected steps thereon, a toggle linkage embodying first and second pivotally connected links swingable in a plane substantially normal to the axis of said roller, means for supporting said roller on said toggle linkage at a point adjacent the knee of the toggle linkage, a lever carried by a fixed pivot and swingable in a plane paralleling said first named plane, said lever and one of said toggle links being pivotally connected and the pivotal connection being adjustable in a direction paralleling the axis of roller rotation, and spring means yieldably urging said lever in a direction to bias said roller toward said pulleys.

2. A speed-change mechanism comprising, in combination, a pair of rotatable stepped-cone driving and driven pulleys disposed side by side in spaced relation, an idler roller intermediate said pulleys and rotatable about an axis paralleling the pulley axes, a toggle linkage embodying first and second pivotally connected links swingable in a plane generally normal to said roller axis and arranged with one of said links projecting substantially between said pulleys, means for journaling said roller on said toggle linkage at a point adjacent the knee of such linkage, a lever carried by a fixed pivot and swingable in a plane paralleling said first named plane, the adjacent part of said lever and said one toggle link being pivotally connected and the pivotal connection being adjustable in a direction paralleling the axis of roller rotation, said connection including a pin on one of said adjacent parts slidable in a complemental aperture in the other, spring means yieldably urging said lever in a direction to bias said roller toward said pulleys, an axially shiftable and oscillatable rock shaft paralleling the axis of roller rotation and having a fixed arm projecting radially therefrom, a pivotal connection between said arm and the second or remaining toggle link, and manual means for axially shifting and oscillating said rock shaft to adjust the position of said roller axially of said pulleys into engagement with selected steps thereon for various speed-change positions of the mechanism.

3. A speed-change mechanism comprising, in combination, sets of driving and driven members, each set being made up of a series of members of successively stepped diameter rotatable about a common axis, an intermediate idler member arranged to be shifted axially of the sets of driving and driven members to contact selected ones thereof, a toggle linkage embodying first and second pivoted links, means for supporting said idler on said toggle linkage for rotation at a point adjacent the knee of the toggle linkage, and means for yieldably urging one end of said toggle links in a direction to move said idler into engagement with said driving and driven members.

4. A speed-change mechanism comprising, in combination, sets of driving and driven members, each set being made up of a series of members of successively stepped diameter rotatable about a common axis, an intermediate idler member, a toggle linkage embodying first and second pivoted links, means for supporting said idler on said toggle linkage for rotation at a point adjacent the knee of the toggle linkage, means for yieldably urging one end of said toggle linkage in a direction to move said idler into engagement with said driving and driven members, said toggle linkage being arranged for substantially straight line transverse movement of the knee thereof as said linkage is swung to one side or the other of its dead-center position to shift said idler into contact with successive members of said sets, and means for shifting said idler axially into registry with selected members in said series of driving and driven members.

ANDREW W. REDIN.